United States Patent
Ganesan et al.

(10) Patent No.: US 11,494,587 B1
(45) Date of Patent: Nov. 8, 2022

(54) SYSTEMS AND METHODS FOR OPTIMIZING PERFORMANCE OF MACHINE LEARNING MODEL GENERATION

(71) Applicant: NTT DATA Services, LLC, Plano, TX (US)

(72) Inventors: Dhurai Ganesan, Chennai (IN); Aananthanarayanan Pandian, Chennai (IN); Tanvir Khan, Allen, TX (US)

(73) Assignee: NTT DATA Services, LLC

( * ) Notice: Subject to any disclaimer, the term of this patent is extended or adjusted under 35 U.S.C. 154(b) by 1052 days.

(21) Appl. No.: 16/168,303

(22) Filed: Oct. 23, 2018

(51) Int. Cl.
  *G06K 9/62* (2022.01)
  *G06N 20/00* (2019.01)

(52) U.S. Cl.
  CPC ......... *G06K 9/6257* (2013.01); *G06K 9/6227* (2013.01); *G06K 9/6254* (2013.01); *G06N 20/00* (2019.01)

(58) Field of Classification Search
  CPC ..... G06K 9/6257; G06K 9/6227; G06N 20/00
  USPC .......................................................... 706/12
  See application file for complete search history.

(56) References Cited

U.S. PATENT DOCUMENTS

| | | |
|---|---|---|
| 5,333,240 A | 7/1994 | Matsumoto et al. |
| 5,490,062 A | 2/1996 | Leach et al. |
| 5,546,503 A | 8/1996 | Abe et al. |
| 6,108,648 A | 8/2000 | Lakshmi et al. |
| 6,332,105 B1 | 12/2001 | Calise et al. |
| 6,449,603 B1 | 9/2002 | Hunter |
| 6,658,396 B1 | 12/2003 | Tang et al. |
| 6,678,669 B2 | 1/2004 | Lapointe et al. |
| 2003/0055796 A1 | 3/2003 | Shetty et al. |
| 2004/0044633 A1 | 3/2004 | Chen |
| 2009/0037351 A1 | 2/2009 | Kristal et al. |

(Continued)

FOREIGN PATENT DOCUMENTS

CN      102682345 A      9/2012

OTHER PUBLICATIONS

Altexsoft, "Preparing Your Dataset for Machine Learning: 8 Basic Techniques That Make Your Data Better," Publised Jun. 16, 2017, URL: <https://www.altexsoft.com/blog/datascience/preparing-your-dataset-for-machine-learning-8-basic-techniques-that-make-your-data-better/>, Retrieved Jan. 23, 2019, six pages.

(Continued)

*Primary Examiner* — Jeffery A Williams
(74) *Attorney, Agent, or Firm* — Shackelford, Bowen, McKinley & Norton, LLP (57) ABSTRACT

In an embodiment, a method includes receiving a trigger of machine learning model generation. In addition, the method includes algorithmically eliminating at least some of rows and at least some of columns of a training dataset, the algorithmically eliminating yielding a size-reduced training dataset. The method additionally includes generating, for a prediction target, a plurality of machine learning models via a plurality of machine learning algorithms. The method also includes measuring prediction accuracies of the plurality of machine learning models relative to the prediction target. Furthermore, the method includes selecting a particular machine learning model. Moreover, the method includes applying the particular machine learning model to a data source.

16 Claims, 6 Drawing Sheets

(56) References Cited

U.S. PATENT DOCUMENTS

2013/0054259 A1     2/2013   Wojtusiak et al.
2018/0314938 A1*   11/2018   Andoni .................. G06N 3/086

OTHER PUBLICATIONS

Knime, "Seven Techniques for Data Dimensionality Reduction," Published: May 12, 2015, URL: <https://www.knime.com/blog/seven-techniques-for-data-dimensionality-reduction>, Retrieved Jan. 23, 2019, eight pages.

Sarode, Ashwini, "Principal Component Analysis: Dimensionality Reduction Technique—Step by Step Approach," Published: Feb. 7, 2018, URL: <https://code.likeagirl.io/principal-component-analysis-dimensionality-reduction-technique-step-by-step-approach-ffd46623ff67>, Retrieved: Jan. 23, 2019, seven pages.

Haykin, Simon, "Feed Forward Neural Networks: An Introduction," Nonlinear Dynamical Systems: Feedforward Neural Network Perspectives, Chapter 1: Supervised Learning, John Wiley & Sons, Inc., 2001, pp. 1-16.

Broyles, T., et al., "An Early Warning System for Reducing ICD-10 Claim Denials," Oct. 5, 2015, URL:<https://www.icd10monitor.com/an-early-warning-system-for-reducing-icd-10-claim-denials?print=1&tmpl=component>, Retrieved May 24, 2018, three pages.

Rao, V. "Claims denials: predicting acceptance / denial of claims," TheMainstreamSeer blog, Feb. 4, 2012, URL: <http://themainstreamseer.blogspot.com/2012/02/claims-denials-predicting-acceptance.html>, Retrieved May 24, 2018, nine pages.

Hu, Sanhe, "A machine learning model to predict the Denial Reason for insurance claim," Denial-Reason-Prediction-Model, GitHub, URL: <https://github.com/MacHu-GWU/Denial-Reason-Prediction-Model>, Retrieved May 24, 2018, eight pages.

Goldman, A., et al., "HIT Think How Providence Health is using IT to predict claims denials," Aug. 19, 2016, URL: <https://www.healthdatamanagement.com/opinion/how-our-organization-is-using-it-to-predict-claims-denials>, Retrieved: May 23, 2018, five pages.

Piaggi, P., et al., "Artificial Neural Networks in the Outcome Prediction of Adjustable Gastric Banding in Obese Women," PLoS One, Oct. 2010, vol. 5, Issue 10, pp. 1-12.

Li, Y., et al., "Model-Driven Feedforward Prediction for Manipulation of Deformable Objects," IEEE Transactions on Automation Science and Engineering, 2018, pp. 1-18.

FrontlineSolvers, "Neural Network Prediction," URL: <https://www.solver.com/neural-network-prediction>, Retrieved: May 23, 2018, five pages.

Wojtusiak, J., et al., "Rule-based Prediction of Medical Claims' Payments, A Method and Initial Application to Medicaid Data," ICMLA Honolulu, HI, 2011, six pages.

* cited by examiner

SYSTEMS AND METHODS FOR OPTIMIZING PERFORMANCE OF MACHINE LEARNING MODEL GENERATION

BACKGROUND

Technical Field

The present disclosure relates generally to machine learning model generation and more particularly, but not by way of limitation, to systems and methods for optimizing performance of machine learning model generation.

History of Related Art

Applying machine learning concepts to data often involves generating a model. However, the machine learning model can be time-consuming to generate. Furthermore, the machine learning model might be less effective than what would be achieved via a different machine learning model.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In one general aspect, in an embodiment, a method of performance-enhanced machine-learning model creation is performed by a computer system. The method includes receiving a trigger of machine learning model generation. The method also includes identifying a training dataset responsive to the trigger, where the training dataset is organized into rows and columns. The method further includes selecting a prediction target from at least one of the columns of the training dataset. In addition, the method includes algorithmically eliminating at least some of the rows and at least some of the columns of the training dataset, the algorithmically eliminating yielding a size-reduced training dataset. The method additionally includes generating, for the prediction target, a plurality of machine learning models via a plurality of machine learning algorithms using a first portion of the size-reduced training dataset. The method also includes measuring prediction accuracies of the plurality of machine learning models relative to the prediction target using a second portion of the size-reduced training dataset. Furthermore, the method includes selecting a particular machine learning model from the plurality of machine learning models based, at least in part, on the measured prediction accuracies. Moreover, the method includes applying the particular machine learning model to a data source. Other embodiments of this aspect include corresponding computer systems, apparatus, and computer programs recorded on one or more computer storage devices, each configured to perform the actions of the methods.

In another general aspect, in an embodiment, a system includes a processor and memory, where the processor and memory in combination are operable to implement a method. The method includes receiving a trigger of machine learning model generation. The method also includes identifying a training dataset responsive to the trigger, where the training dataset is organized into rows and columns. The method further includes selecting a prediction target from at least one of the columns of the training dataset. In addition, the method includes algorithmically eliminating at least some of the rows and at least some of the columns of the training dataset, the algorithmically eliminating yielding a size-reduced training dataset. The method additionally includes generating, for the prediction target, a plurality of machine learning models via a plurality of machine learning algorithms using a first portion of the size-reduced training dataset. The method also includes measuring prediction accuracies of the plurality of machine learning models relative to the prediction target using a second portion of the size-reduced training dataset. Furthermore, the method includes selecting a particular machine learning model from the plurality of machine learning models based, at least in part, on the measured prediction accuracies. Moreover, the method includes applying the particular machine learning model to a data source. Other embodiments of this aspect include corresponding computer systems, apparatus, and computer programs recorded on one or more computer storage devices, each configured to perform the actions of the methods. Various embodiments of this aspect include corresponding computer systems, apparatus, and computer programs recorded on one or more computer storage devices, each configured to perform the actions of the methods.

In another general aspect, in an embodiment, a computer-program product includes a non-transitory computer-usable medium having computer-readable program code embodied therein, the computer-readable program code adapted to be executed to implement a method. The method includes receiving a trigger of machine learning model generation. The method also includes identifying a training dataset responsive to the trigger, where the training dataset is organized into rows and columns. The method further includes selecting a prediction target from at least one of the columns of the training dataset. In addition, the method includes algorithmically eliminating at least some of the rows and at least some of the columns of the training dataset, the algorithmically eliminating yielding a size-reduced training dataset. The method additionally includes generating, for the prediction target, a plurality of machine learning models via a plurality of machine learning algorithms using a first portion of the size-reduced training dataset. The method also includes measuring prediction accuracies of the plurality of machine learning models relative to the prediction target using a second portion of the size-reduced training dataset. Furthermore, the method includes selecting a particular machine learning model from the plurality of machine learning models based, at least in part, on the measured prediction accuracies. Moreover, the method includes applying the particular machine learning model to a data source. Other embodiments of this aspect include corresponding computer systems, apparatus, and computer programs recorded on one or more computer storage devices, each configured to perform the actions of the methods. Various embodiments of this aspect include corresponding computer systems, apparatus, and computer programs recorded on one or more computer storage devices, each configured to perform the actions of the methods.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION

In certain embodiments, data processing can occur via one or more machine learning (ML) algorithms that are applied to incoming data streams. In various cases, the data processing can involve performing particular tasks with respect to the incoming data streams. The particular tasks can involve, for example, predicting data, generating new data, performing configurable workflows, combinations of the foregoing and/or the like. ML can use various techniques to learn to perform the particular tasks, without being explicitly programmed for the tasks, in some cases using training data that is of a same format as the incoming data stream. In general, ML can encompass various types of algorithms such as, for example, decision tree learning, association rule learning, artificial neural networks (including deep learning and, in particular, feed forward networks), inductive logic programming, support vector machines, clustering. Bayesian networks, reinforcement learning, representation learning, similarity and metric learning, sparse dictionary learning, genetic algorithms, rule-based ML, gradient boosting, ML based on generalized linear modeling, random forest, ensemble learning, combinations of the foregoing and/or the like.

Problematically, different ML algorithms can behave differently, or be more or less effective, for different types of datasets and different types of tasks. Furthermore, for any given ML algorithm, different configuration settings can increase or decrease that algorithm's effectiveness. Particularly in a multitenant environment with different types of datasets being used for a variety of different tasks, it is not generally technically feasible to apply the best ML algorithm to each and every task, for each and every dataset, and for each and every tenant, because each task, dataset and tenant can introduce variability. In addition, the creation of ML models is resource-intensive, as evidenced by processor and memory utilization. This is due, in part, to the physical sizes of typical training datasets.

The present disclosure describes examples of optimizing computer performance of ML-based data processing. In certain embodiments, a size-reduced training dataset can be generated, for example, as a result of algorithmically eliminating columns or rows of a training dataset. Furthermore, in various embodiments. ML models can be generated via heterogeneous ML frameworks and selected and adapted to particular data sources. In this way, data processing of incoming data streams can be demonstrably improved in accuracy and effectiveness.

Figure 1:
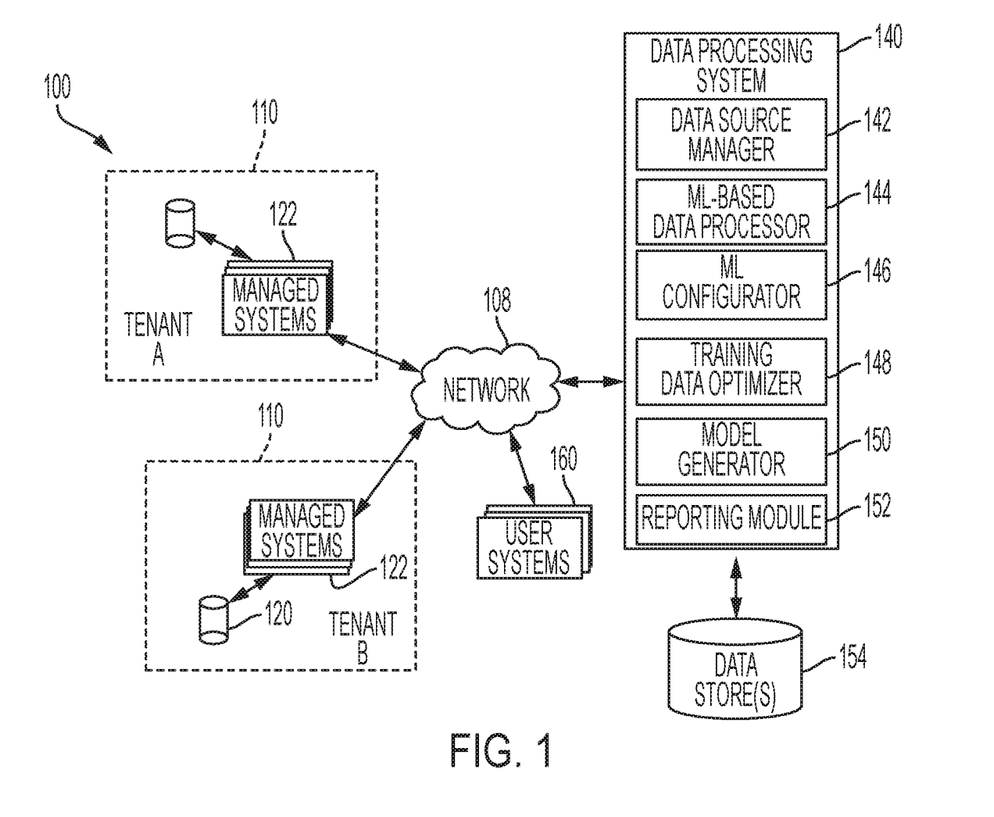
FIG. 1 illustrates an example computing environment for implementing a data processing system.

FIG. 1 illustrates an example computing environment 100 for implementing a data processing system 140. The computing environment 100 includes the data processing system 140, tenant systems 110, user systems 160 and data store(s) 154, each of which is operable to communicate over a network 108. The network 108 may be a private network, a public network, a local or wide area network, a portion of the Internet, combinations of the same, and/or the like.

In certain embodiments, the data processing system 140 can centrally manage ML-based data processing of data sources for its tenants. In particular, in the computing environment 100, the tenant systems 110 can be served by the data processing system 140. The tenant systems 110 shown can be owned or operated by the same or different entities. For example, one of the tenant systems 110 is shown as owned or operated by "Tenant A" while another system 110 is owned or operated by a different tenant, "Tenant B." The tenant systems 110 shown can be owned or operated by the same or different entities. For example. Tenants A and B can represent customers (e.g., entities such as companies or individuals) of an operator of the data processing system 140. Although the term "tenant" is used herein to describe the systems 110 or owners/operators thereof, in addition to having its ordinary meaning, the term "tenant" can, but need not, refer to tenancy in a multitenant software architecture.

More specifically, the tenant systems 110 can include one or more computer systems 122 that are each communicably coupled to, or include, one or more managed data sources 120. The one or more managed data sources 120 can include data streams or datasets that can be processed by the data processing system 140. In various cases, the one or more data sources 120 can be updated by the computer systems 122, or other components, in real-time, on a periodic basis. e.g., according to a schedule, on-demand or a combination of the same.

In the illustrated embodiment, the data processing system 140 can include a data source manager 142, an ML-based data processor 144, an ML configurator 146, a training data optimizer 148, a model generator 150 and a reporting module 152. Each of these components can be implemented with hardware and/or software, including (optionally) virtual machines. In an example, the data processing system 140 can be implemented as a single management server. In another example, the data processing system 140 can be implemented in a plurality of virtual or physical servers, which may or may not be geographically co-located. In some embodiments, the data processing system 140 and/or other aspects of the computing environment 100 may be hosted on a cloud-provider system such as the Azure™ service provided by Microsoft® or the EC2™ platform provided by Amazon®.

In certain embodiments, features of the components of the data processing system 140 can be made accessible over an interface to the user systems 160. The user systems 160 can include any type of computing device, including computer systems such as desktops, laptops, tablets, smartphones, and wearable or body-borne computers, to name a few. The user systems 160 can be operated by users associated with the tenants or by other users.

The data source manager 142 can coordinate the managed data sources 120. In various embodiments, the data source manager 142 can identify, receive, pull, and/or communicate with the computer systems 122 so as to enable processing of the managed data sources 120. In some embodiments, the data source manager 142 can serve a data collection function. In these embodiments, the computer systems 122 can obtain or collect datasets in real-time, periodically, e.g., according to a schedule, on-demand, or a combination of the same. In some cases, such datasets can be provided as a live stream. In some cases, data from the managed data sources 120 can be collected and stored in the data store(s) 154. In other cases, the data can remain at the managed data sources 120.

The ML-based data processor 144 can process data according to a plurality of ML algorithms supported thereby, potentially using different ML models, representative of different configuration settings and/or ML algorithms, for different data sources. The processing performed by the ML-based data processor 144 can involve executing particular tasks with respect to the data such as, for example, data prediction, generation of new data, execution of configurable workflows, combinations of the foregoing and/or the like. For illustrative purposes, examples will be described herein relative to data prediction. A particular ML model that is used for each of the managed data sources 120 can be maintained by the ML-based data processor 144 and stored, for example, in data store(s) 154. As described in greater detail below, the particular ML model that is used for each of the managed data sources can be configurable and effected via, for example, operation of the ML configurator 146.

The ML configurator 146 can interact with the model generator 150 to individually adapt ML-based data processing to individual characteristics of each of the managed data sources 120. For example, at a time of instituting ML-based data processing of each managed data source of the managed data sources 120, or at any other time that may be desirable in a given implementation, the ML configurator 146 can receive, or identify, a training dataset that is representative of data to be provided by the managed data source and processed by the ML-based data processor 144. For any given managed data source of the managed data sources 120, the ML configurator 146 can use the model generator 150 to generate, and specially configure, candidate ML models for the given managed data source using the training dataset.

In a typical embodiment, the candidate ML models generated and specially configured by the model generator 150 can include one or more candidate models for each of the plurality of ML models supported by the ML-based data processor 144. In certain embodiments, the ML configurator 146 can automatically identify, or select, a particular ML model, from among the plurality of candidate ML models, to apply to the given managed data source. In various cases, the particular ML model that is identified and applied can be a model that is deemed best or optimal based on a configurable standard. For example, in certain embodiments, the ML configurator 146 and/or the model generator 150 can measure an accuracy or effectiveness of the candidate ML models using a withheld portion of the training dataset, and then select a most-accurate candidate model. In this way, in certain implementations, the ML configurator 146 can apply, to each of the managed data sources 120, a particularly advantageous ML model from among the one or more ML models, thereby demonstrably improving the efficiency, effectiveness and accuracy of the ML-based data processing performed by the ML-based data processor 144.

In many cases, the ML configurator 146 can use the training data optimizer 148 to discernibly improve the processing speed and efficiency of the model generator 150. The training data optimizer 148 can process the training dataset, which was identified or received by the ML configurator 146, to produce a size-reduced training dataset. In certain implementations in which the training dataset includes, for example, relational data representable in a table, the processing can include algorithmically eliminating rows and/or columns of the relational data, such that the size-reduced training dataset includes fewer rows and/or columns than the training dataset. In certain embodiments, the model generator 150 can use the size-reduced training dataset instead of the training dataset when creating the candidate models described above. In various embodiments, by using the size-reduced training dataset instead of the training dataset, the model generator 150 can greatly increase its speed of operation.

In certain embodiments, the ML configurator 146 can be triggered whenever it is desirable to determine or select an ML algorithm for the managed data sources 120. In some cases, the ML configurator 146 can be automatically triggered whenever a new data source is added to the managed data sources 120. In other cases, the ML configurator 146 can be manually triggered or triggered on a periodic basis to re-evaluate how ML-based data processing is occurring with respect to some or all of the managed data sources 120. For example, in certain embodiments, the ML configurator 146 can publish a configuration interface to the user systems 160, for example, for administrators, super users or other users (e.g., of a particular tenant) to select or specify commands for initiating and/or providing data related to operation of the ML configurator 146. The data store(s) 154 can store ML frameworks that implement the ML algorithms, configuration settings of ML models and/or ML frameworks, and/or other data used by the ML configurator 146, the training data optimizer 148, the model generator 150 and/or other components of the computing environment 100.

The reporting module 152 can generate regular or on-demand reports related to the ML-based data processor 144, the ML configurator 146, the training data optimizer 148, the model generator 150 and/or any other component of the computing environment. The reporting module 152 can publish reports or other generated information, for example, to a web page, dashboard, and/or the like. The reporting module 152 can also generate and execute a query of the data store(s) 154. The web page, user dashboard or other user interface(s) output, for example, by the reporting module 152, can be accessed by users of the user systems 160. The reporting module 152 can also provide a user interface, for instance, that allows the users of the user systems 160 to obtain customized data related to any data maintained by the data store(s) 154.

In general, the data store(s) 154 can include any information collected, stored or used by the data processing system 140. For example, in various embodiments, the data store(s) 154 can include ML models, ML frameworks, identification of ML models used for particular managed data sources of the managed data sources 120, software, training datasets, data collected or received from the managed data sources 120, data processed by the ML-based data processor 144, combinations of the same and/or the like. In certain embodiments, data stored in the data store(s) 154 can take the form of repositories, flat files, databases, etc.

Figure 2:
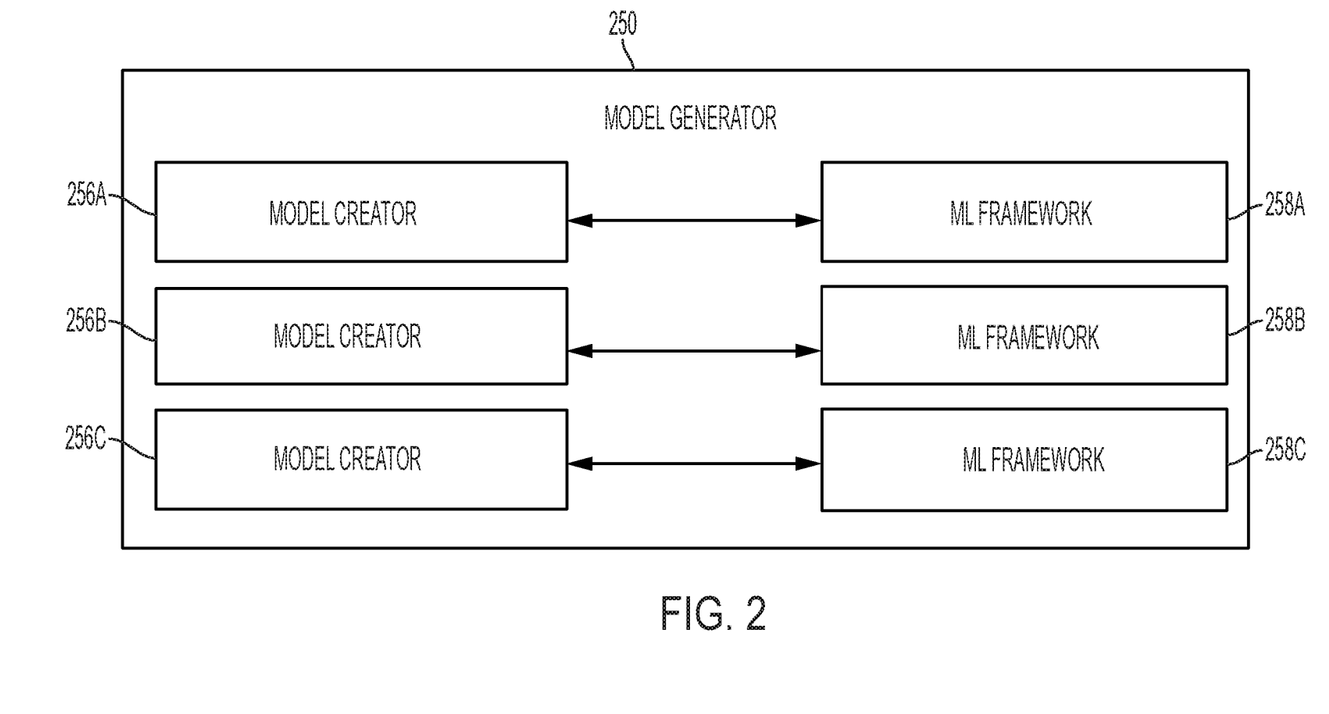
FIG. 2 illustrates an example of a model generator.

FIG. 2 illustrates an example of a model generator 250. In general, the model generator 250 can function as described with respect to the model generator 150 of FIG. 1. The model generator 250 is shown to include model creators 256A, 256B and 256C (collectively, model creators 256) that are operable to create ML models for ML frameworks 258A, 258B and 258C, respectively (collectively, ML frameworks 258). It should be appreciated that the ML frameworks 258 are shown as residing within the model generator 250 for simplicity of illustration and description. In various embodiments, the ML frameworks 258 can exist separately from the model generator 250 and be located outside the model generator 250.

In certain embodiments, each of the ML frameworks 258 can be representative of a distinct ML algorithm that can be used for ML model generation. In an example, the model creator 256A can be used to specially configure ML model generation using the ML framework 258A, for example, by creating configuration settings and testing their accuracy and effectiveness for a given dataset. In similar fashion, the model creators 256B and 256C can be used to specially configure ML model generation using the ML frameworks 258B and 258C, respectively. Example operation of the model generator 250 will be described in greater detail with respect to FIGS. 3-4.

Figure 3:
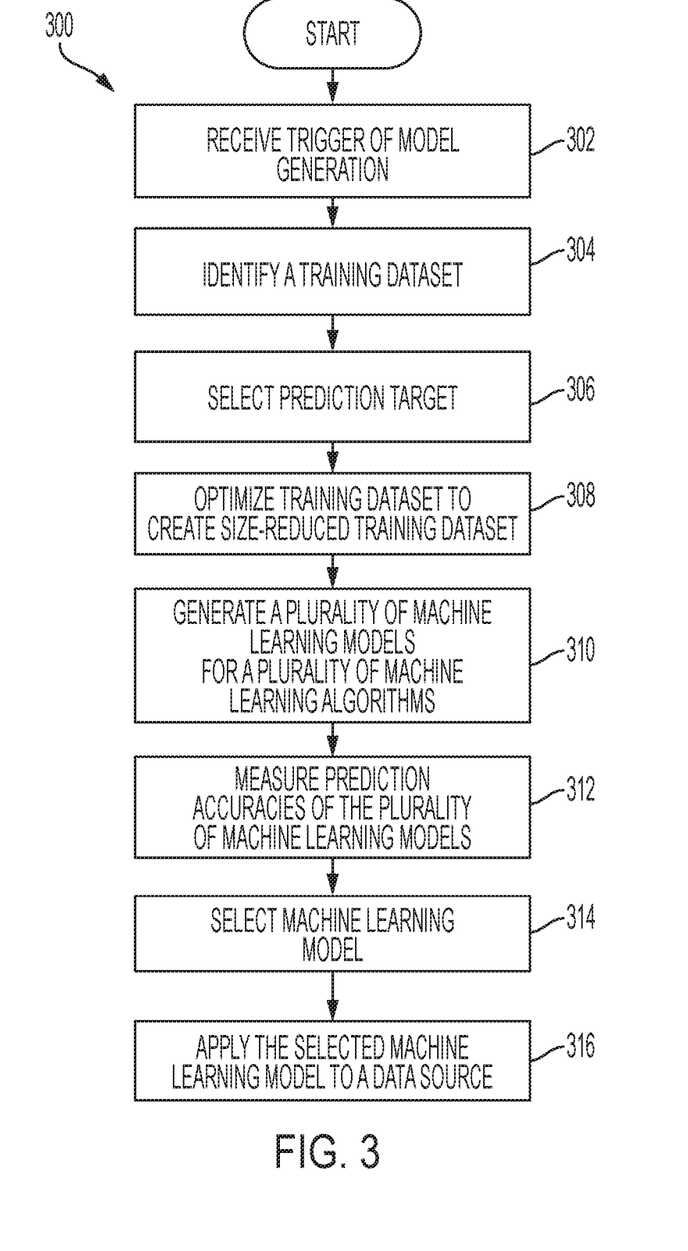
FIG. 3 illustrates an example of a process for automatically optimizing machine-learning models for data processing.

FIG. 3 illustrates an example of a process 300 for automatically optimizing ML models for data processing. In certain embodiments, the process 300 can be executed, for example, by the data source manager 142, the ML-based data processor 144, the ML configurator 146, the training data optimizer 148, the model generator 150 and/or the reporting module 152, all of FIG. 1. The process 300 can also be executed generally by the data processing system 140 of FIG. 1. Although the process 300 can be executed by any number of different components, to simplify discussion, the process 300 will be described relative to specific components of the data processing system 140.

At block 302, the ML configurator 146 receives a trigger for model generation. In some embodiments, the trigger can be a command that is input or transmitted by a user or administrator. In addition, or alternatively, the trigger can be an automated command that is received from a computer system or data source. In addition, or alternatively, the trigger can be a scheduled trigger to periodically optimize model utilization for one or more data sources. The trigger can also be a result of a manual or automatic determination that an existing model, if any, is unsatisfactory.

At block 304, the ML configurator 146 identifies a training dataset for the model generation. The training dataset can be, for example, relational data arranged into rows and columns. In general, the training dataset conforms to a format of data that will be received via the data source, such as one of the managed data sources 120, and includes representative values of such data. In many cases, the training dataset can be specified by, or in conjunction with, the trigger received at the block 302. The training dataset can be identified in any suitable fashion. For example, in some cases, the training dataset can be identified by its storage location or by information sufficient to determine its storage location. In some such cases, the training dataset can reside in one of the tenant systems 110, for example, in one of the managed data sources 120. In other cases, the training dataset can be identified by virtue of its provision or transfer to the ML configurator 146 or another component of the computing environment 100.

At block 306, the ML configurator 146 selects a prediction target. The prediction target can correspond to a column of the training dataset that, for an incoming data stream of a same general form as the training dataset, would correspond to values produced by the ML-based data processor 144. The prediction target can be, for example, a particular column of the training dataset, with the remaining columns generally corresponding to values that would be provided in the incoming data stream. In that way, in a typical embodiment, the prediction target can represent a column for which values would not be provided in an incoming data stream from a given managed data source such as the managed data sources 120 of FIG. 1, and the values of the prediction target would, after receipt, be predicted based on values in the other columns. The training dataset, however, typically includes values in the column that is the prediction target, which values can be used as training values for ML model generation. In an example implementation in which medical claims are processed, the prediction target could be a binary value indicative of rejection or non-rejection of a given medical claim. In various embodiments, the prediction target can be user-specified, for example, in conjunction with the identification of the training dataset.

At block 308, the ML configurator 146 causes the training data optimizer 148 to optimize the training dataset to create a size-reduced training dataset. In various embodiments, the size-reduced training dataset can be a version of the training dataset with fewer rows and/or columns. In one aspect, the training data optimizer 148 can algorithmically eliminate at least some of the rows of the training dataset. In an example, the training data optimizer 148 can cleanse the training dataset of records that are missing values, have inaccurate values, or include values that represent outliers. In another example, the training data optimizer 148 can use aggregation to fold together records into a smaller number of total records. According to this example, an aggregator can use ML concepts to group together records based on one or more attribute values, so as to reduce the number of total records in the training dataset.

In another aspect, potentially after algorithmically reducing the total number of rows, the training data optimizer 148 can algorithmically eliminate at least some of the columns of the training dataset. For example, in certain embodiments, the training data optimizer 148 can perform a principal component analysis to identify principal components, from among the columns of the training dataset, for the prediction target that was selected at block 306. In certain embodiments, the principal component analysis can convert a set of columns in the training dataset into a set of linearly uncorrelated variables, or principal components, where the training data optimizer 148 can identify top columns for the training dataset, or those columns which contribute, for example, over a threshold (e.g., 99.9%) in terms of factor importance. In certain embodiments, those columns which do not contribute, for example, over the threshold in terms of factor importance can be eliminated, or not included in, the size-reduced training dataset.

At block 310, the ML configurator 146 causes the model generator 150 to generate, for the prediction target, a plurality of ML models for a plurality of ML algorithms or frameworks. In a typical embodiment, the model generation at the block 310 is performed using a first portion of the size-reduced training dataset so that, as described in greater detail below, a withheld portion of the size-reduced training dataset can be utilized for accuracy measurements relative to the prediction target. For example, in some embodiments, a certain number or percentage of records such as, for example, ninety percent, may be used for model generation, while the remaining number or percentage (e.g., ten percent) can be withheld for accuracy assessments.

For example, with reference to FIG. 2, using the model generator 250 as an example of the model generator 150, the model generator 250 can output one or more ML models for each of the ML frameworks 258. In certain embodiments, the model creator 256A can progressively create a plurality of candidate models via the ML framework 258A, using different, adjusted configuration settings, until configurable criteria is satisfied (or not satisfied, as the case may be). The model creators 256B and 256C can operate in similar fashion relative to the ML frameworks 258B and 258C, respectively.

In certain embodiments, the plurality of models that are output can result from individual analysis and evaluation of a plurality of candidate models by each of the model creators 256. In some embodiments, the plurality of models that are output by the model generator 250 can include a single ML model for each of the ML frameworks 258, where the single ML model has been deemed best or optimal by a corresponding ML creator relative to its corresponding ML framework of the ML frameworks 258. In other cases, the plurality of models can include more than one model for a particular ML framework of the ML frameworks 258 and/or zero models for one or more of the ML frameworks 258. Example functionality that can be performed at the block 310 will be described in greater detail relative to FIG. 4.

At block 312, the ML configurator 146 measures prediction accuracies of the plurality of ML models that were generated at block 310 using the withheld portion of the size-reduced training dataset, as if values for the corresponding prediction target were not present. For example, using the values in the non-prediction target columns in the size-reduced training dataset, the ML configurator 146 can cause predictions to occur via the plurality ML models and then compare the predictions to the actual values for the prediction target. The prediction accuracies can be measured in any suitable fashion such as, for example, as a proportion or percentage of the predictions that match the actual values in the size-reduced training dataset.

At block 314, the ML configurator 146 selects a particular ML model from the plurality of ML models based on the measured prediction accuracies. For example, in some embodiments, the ML configurator 146 can select a most-accurate ML model according to the measurements at the block 312. At block 316, the ML configurator 146 applies the selected ML model to a data source. In a typical embodiment, from this point forward, the ML-based data processor 144 processes data from the data source using the selected ML model, thereby demonstrably improving data processing of incoming data streams in accuracy and effectiveness.

Figure 4:
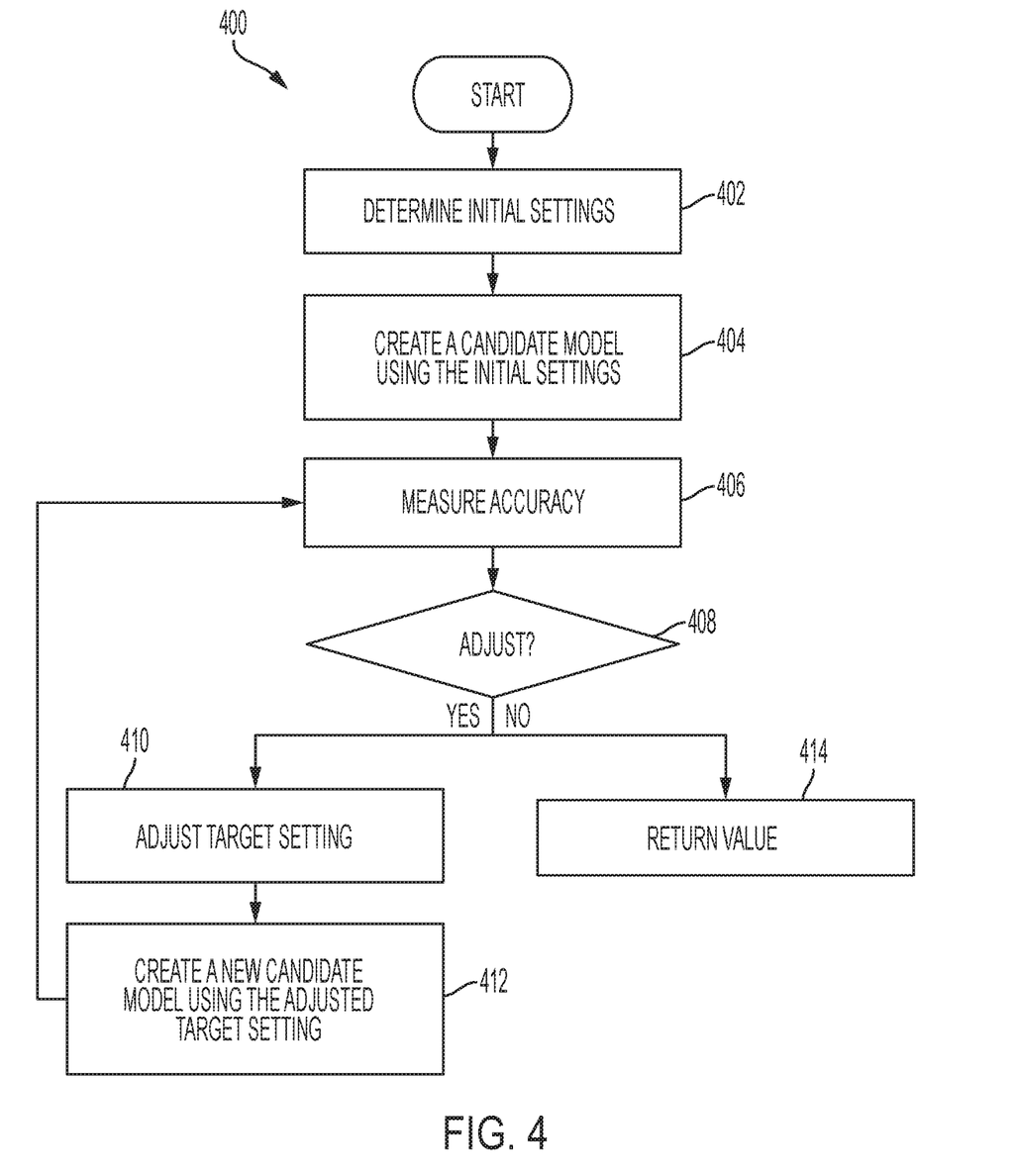
FIG. 4 illustrates an example of a process for progressively creating a plurality of candidate models using different configuration settings.

FIG. 4 illustrates an example of a process 400 for progressively creating a plurality of candidate models using different configuration settings. In certain embodiments, the process 400 can be performed, for example, by each of the model creators 256 of FIG. 2, as part of the block 310 of FIG. 3.

For simplicity of description, the process 400 will be described as being performed by the model creator 256A relative to the ML framework 258A, with particular focus on a particular configuration setting, referred to below as a target setting, so as to arrive at a value of the target setting that is deemed best or optimal. In a typical embodiment, the process 400 can be repeated by the model creator 256A for each of a plurality of configuration settings, so that each such setting is treated as a target setting, so as to establish best or optimal values of each such setting, with a best or optimal candidate model being determined as a model that includes the established best or optimal values of each such setting. In addition, the process 400 can be performed in parallel, for example, by each of the model creators 256 relative to corresponding ML frameworks of the ML frameworks 258, so as to arrive at a best or optimal candidate model for each of the ML frameworks 258.

Figure 5:
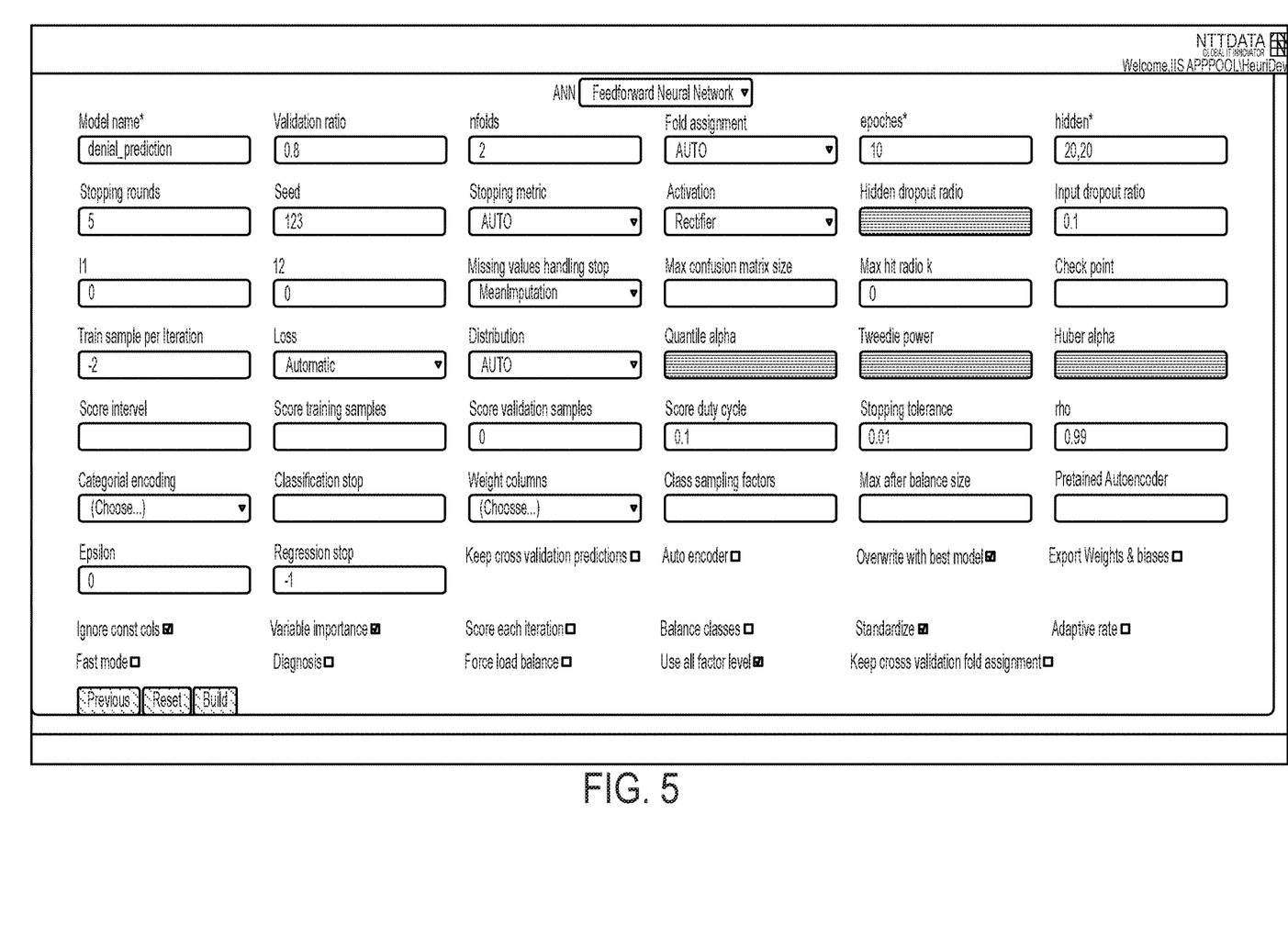
FIG. 5 illustrates examples of configuration settings.

At block 402, the model creator 256A determines initial configuration settings for ML model creation using the ML framework 258A, including an initial value of the target setting. The initial configuration settings can be, for example, default settings that exist in a data store such as the data store(s) 154 of FIG. 1. In some cases, multiple sets of default settings can exist for the ML framework 258A, for example, in dependence upon various factors such as, for example, a particular tenant, a number of records in a size-reduced training dataset, and/or other factors. In addition, in some cases, the initial configuration settings can be user-specified, automatically determined based on known information about the size-reduced training dataset, or established in another suitable way. FIG. 5 illustrates examples of configuration settings.

At block 404, the model creator 256A creates a candidate model using the ML framework 258A and the initial configuration settings. At block 406, the model creator 256A measures a prediction accuracy of the candidate model. In a typical embodiment, the prediction accuracy can be measured as described relative to the block 312 of FIG. 3.

At decision block 408, the model creator 256A determines whether to adjust the target setting and create a new candidate model. In various embodiments, the determination at the decision block 408 can be based on configurable continuation criteria. In a typical embodiment, the first iteration through the decision block 408 results in an affirmative determination so as to enable further testing. With respect to additional iterations through the decision block 408, the continuation criteria can vary in nature depending on a type of the target setting.

In an example, if the target setting is a numerical value, the continuation criteria may be based on accuracy-improvement criteria. Accuracy-improvement criteria can specify, for example, that a most-recent candidate model provide improved accuracy relative to a previous candidate model. In addition, in some cases, an affirmative determination can result even without improved accuracy, for example, for purposes of proceeding with a different type of adjustment (e.g., decrease relative to an initial value instead of increase). In another example, if the target setting is a categorical value, such that the target setting is selected from a defined set of options, the continuation criteria can require, for example, that each selectable option be tested, such that the process 400 continues until each selectable option has been tested.

If it is determined at the decision block 408 that the target setting will not be adjusted, the process 400 proceeds to block 414, where a best or optimal value of the target setting is returned. Otherwise, if it is determined at the decision block 408 to adjust the target setting, the process 400 proceeds to block 410 for a value adjustment.

At block 410, the model creator 256A adjusts the target setting according to a configuration of the model creator 256A. For example, if the target setting is numerical in nature, the target setting can be incrementally increased, incrementally decreased, or the like. By way of further example, if the target setting is categorical in nature, the target setting can be assigned an option that has not been previously selected. At block 412, the model creator 256A creates a new candidate model using the ML framework 258A and new configuration settings that include the adjusted target setting. From block 412, the process 400 returns to block 406 and executes as described previously.

The process 400 can continue until, for example, the process 400 exits following block 414, the process 400 is terminated by an administrator or other user, or other suitable stop criteria is satisfied. In a typical embodiment, the process 400 ends with a deemed best or optimal value for the target setting. As described above, repeated executions of the process 400 relative to different configuration settings can result in best or optimal values for each such configuration setting being determined. In a typical embodiment, following the repeated executions, a best or optimal model for the ML framework 258A can be determined to be a model utilizing each such best or optimal value.

Various illustrative embodiments are described above, in which ML models are automatically generated and selected. In some embodiments, ML model selection and generation can be a user-guided process, where a user selects an ML framework, for example, and initiates generation of a best or optimal model for that framework. In addition, or alternatively, in some embodiments, users can refine or adjust configuration settings before or after model generation using an interface similar to the one shown in FIG. 5. Other variations will be apparent to one skilled in the art after reviewing the present disclosure.

Figure 6:
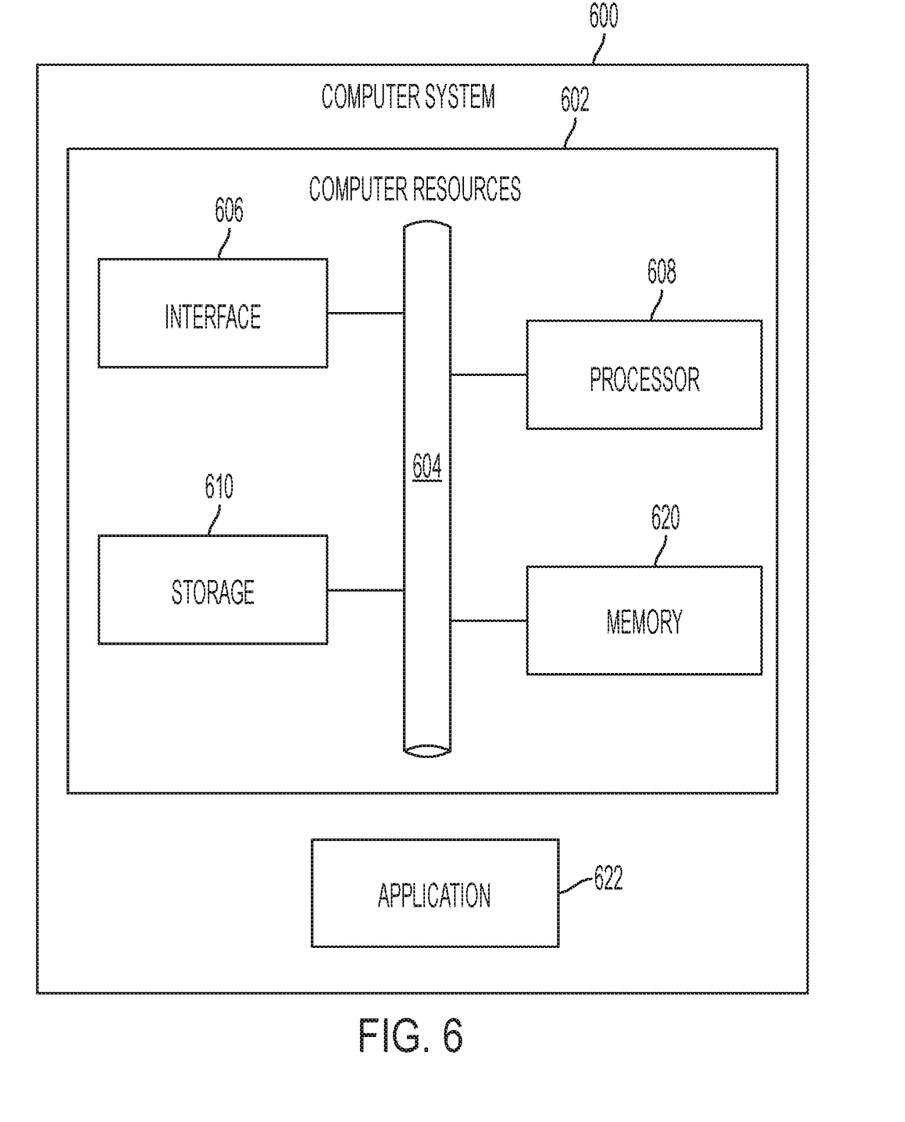
FIG. 6 illustrates an example of a computer system.

FIG. 6 illustrates an example of a computer system 600. In some cases, the computer system 600 can be representative, for example, of any of the tenant systems 110 or components thereof, the user systems 160, and/or the data processing system 140 or components thereof. The computer system 600 includes an application 622 operable to execute on computer resources 602. The application 622 can include, for example, logic for determining what control filter, if any, to implement, what control signal to send to an actuator, filter-specific logic, combinations of the foregoing and/or the like. In particular embodiments, the computer system 600 may perform one or more actions described or illustrated herein. In particular embodiments, one or more computer systems may provide functionality described or illustrated herein. In particular embodiments, encoded software running on one or more computer systems may perform one or more actions described or illustrated herein or provide functionality described or illustrated herein.

The components of the computer system 600 may include any suitable physical form, configuration, number, type and/or layout. As an example, and not by way of limitation, the computer system 600 may include an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 600 may include one or more computer systems; be unitary or distributed; span multiple locations; span multiple machines; or reside in a cloud, which may include one or more cloud components in one or more networks.

In the depicted embodiment, the computer system 600 includes a processor 608, memory 620, storage 610, interface 606 and bus 604. Although a particular computer system is depicted having a particular number of particular components in a particular arrangement, this disclosure contemplates any suitable computer system having any suitable number of any suitable components in any suitable arrangement.

Processor 608 may be a microprocessor, controller, or any other suitable computing device, resource, or combination of hardware, software and/or encoded logic operable to execute, either alone or in conjunction with other components. (e.g., memory 620), the application 622. Such functionality may include providing various features discussed herein. In particular embodiments, processor 608 may include hardware for executing instructions, such as those making up the application 622. As an example, and not by way of limitation, to execute instructions, processor 608 may retrieve (or fetch) instructions from an internal register, an internal cache, memory 620, or storage 610; decode and execute them; and then write one or more results to an internal register, an internal cache, memory 620, or storage 610.

In particular embodiments, processor 608 may include one or more internal caches for data, instructions, or addresses. This disclosure contemplates processor 608 including any suitable number of any suitable internal caches, where appropriate. As an example, and not by way of limitation, processor 608 may include one or more instruction caches, one or more data caches and one or more translation lookaside buffers (TLBs). Instructions in the instruction caches may be copies of instructions in memory 620 or storage 610 and the instruction caches may speed up retrieval of those instructions by processor 608. Data in the data caches may be copies of data in memory 620 or storage 610 for instructions executing at processor 608 to operate on; the results of previous instructions executed at processor 608 for access by subsequent instructions executing at processor 608, or for writing to memory 620, or storage 610; or other suitable data. The data caches may speed up read or write operations by processor 608. The TLBs may speed up virtual-address translations for processor 608. In particular embodiments, processor 608 may include one or more internal registers for data, instructions, or addresses. Depending on the embodiment, processor 608 may include any suitable number of any suitable internal registers, where appropriate. Where appropriate, processor 608 may include one or more arithmetic logic units (ALUs); be a multi-core processor; include one or more processors 608; or any other suitable processor.

Memory 620 may be any form of volatile or non-volatile memory including, without limitation, magnetic media, optical media, random access memory (RAM), read-only memory (ROM), flash memory, removable media, or any other suitable local or remote memory component or components. In particular embodiments, memory 620 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 620 may include one or more memories 620, where appropriate. Memory 620 may store any suitable data or information utilized by the computer system 600, including software embedded in a computer readable medium and/or encoded logic incorporated in hardware or otherwise stored (e.g., firmware). In particular embodiments, memory 620 may include main memory for storing instructions for processor 608 to execute or data for processor 608 to operate on. In particular embodiments, one or more memory management units (MMUs) may reside between processor 608 and memory 620 and facilitate accesses to memory 620 requested by processor 608.

As an example, and not by way of limitation, the computer system 600 may load instructions from storage 610 or another source (such as, for example, another computer system) to memory 620. Processor 608 may then load the instructions from memory 620 to an internal register or internal cache. To execute the instructions, processor 608 may retrieve the instructions from the internal register or internal cache and decode them. During or after execution of the instructions, processor 608 may write one or more results (which may be intermediate or final results) to the internal register or internal cache. Processor 608 may then write one or more of those results to memory 620. In particular embodiments, processor 608 may execute only instructions in one or more internal registers or internal caches or in memory 620 (as opposed to storage 610 or elsewhere) and may operate only on data in one or more internal registers or internal caches or in memory 620 (as opposed to storage 610 or elsewhere).

In particular embodiments, storage 610 may include mass storage for data or instructions. For example, in various embodiments, storage 610 can store configurations such as the configurations 218 of FIG. 2. As an example, and not by way of limitation, storage 610 may include a hard disk drive (HDD), a floppy disk drive, flash memory, an optical disc, a magneto-optical disc, magnetic tape, or a Universal Serial Bus (USB) drive or a combination of two or more of these. Storage 610 may include removable or non-removable (or fixed) media, where appropriate. Storage 610 may be internal or external to the computer system 600, where appropriate. In particular embodiments, storage 610 may be non-volatile, solid-state memory. In particular embodiments, storage 610 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 610 may take any suitable physical form and may include any suitable number or type of storage. Storage 610 may include one or more storage control units facilitating communication between processor 608 and storage 610, where appropriate.

In particular embodiments, interface 606 may include hardware, encoded software, or both providing one or more interfaces for communication (such as, for example, packet-based communication) among any networks, any network devices and/or any other computer systems. As an example, and not by way of limitation, communication interface 606 may include a network interface controller (NIC) or network adapter for communicating with an Ethernet or other wire-based network and/or a wireless NIC (WNIC) or wireless adapter for communicating with a wireless network.

Depending on the embodiment, interface 606 may be any type of interface suitable for any type of network for which computer system 600 is used. As an example, and not by way of limitation, computer system 600 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 600 may include any suitable interface 606 for any one or more of these networks, where appropriate.

In some embodiments, interface 606 may include one or more interfaces for one or more I/O devices. One or more of these I/O devices may enable communication between a person and the computer system 600. As an example, and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 606 for them. Where appropriate, interface 606 may include one or more drivers enabling processor 608 to drive one or more of these I/O devices. Interface 606 may include one or more interfaces 606, where appropriate.

Bus 604 may include any combination of hardware, software embedded in a computer readable medium and/or encoded logic incorporated in hardware or otherwise stored (e.g., firmware) to couple components of the computer system 600 to each other. As an example, and not by way of limitation, bus 604 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 604 may include any number, type and/or configuration of buses 604, where appropriate. In particular embodiments, one or more buses 604 (which may each include an address bus and a data bus) may couple processor 608 to memory 620. Bus 604 may include one or more memory buses.

Herein, reference to a computer-readable storage medium encompasses one or more tangible computer-readable storage media possessing structures. As an example, and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 608 (such as, for example, one or more internal registers or caches), one or more portions of memory 620, one or more portions of storage 610, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language. The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently. e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may." "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method of performance-enhanced machine-learning model creation comprising, by a computer system:
   receiving a trigger of machine learning model generation;
   identifying a training dataset responsive to the trigger, wherein the training dataset is organized into rows and columns;
   selecting a prediction target from at least one of the columns of the training dataset;
   algorithmically eliminating at least some of the rows and at least some of the columns of the training dataset, the algorithmically eliminating yielding a size-reduced training dataset;
   generating, for the prediction target, a plurality of machine learning models via a plurality of machine learning algorithms using a first portion of the size-reduced training dataset, wherein the generating includes, for each machine learning algorithm of the plurality of machine learning algorithms, progressively creating a plurality of candidate models for the machine learning algorithm using different configuration settings, and wherein the machine learning model generated via the machine learning algorithm corresponds to a particular candidate model of the plurality of candidate models;
   wherein the progressively creating the plurality of candidate models comprises:
      creating a first candidate model using particular configuration settings of the machine learning algorithm;
      adjusting at least one of the particular configuration settings;
      creating a second candidate model using the adjusted at least one of the particular configuration settings;
      responsive to a determination that the second candidate model satisfies continuation criteria relative to the first candidate model, further adjusting the at least one of the particular configuration settings; and
      creating a third candidate model using the further adjusted at least one of the particular configuration settings;
   measuring prediction accuracies of the plurality of machine learning models relative to the prediction target using a second portion of the size-reduced training dataset;
   selecting a particular machine learning model from the plurality of machine learning models based, at least in part, on the measured prediction accuracies; and
   applying the particular machine learning model to a data source.

2. The method of claim 1, wherein the continuation criteria is based at least partly on accuracy improvement.

3. The method of claim 1, wherein the continuation criteria requires that each selectable option of a plurality of selectable options be tested.

4. The method of claim 1, the algorithmically eliminating at least some of the columns comprising performing a principal component analysis to identify principal components, from among the columns of the training dataset, for the prediction target.

5. The method of claim 4, the algorithmically eliminating at least some of the columns comprising:
converting the columns into a set of linearly uncorrelated variables;
identifying particular columns of the converted columns that contribute over a threshold in terms of factor importance; and
eliminating any columns of the converted columns that do not contribute over the threshold in terms of factor importance.

6. The method of claim 1, the algorithmically eliminating at least some of the rows comprising cleansing the training dataset of at least one of:
particular rows that are missing one or more values;
particular rows that include one or more inaccurate values; and
particular rows that include one or more outliers.

7. The method of claim 1, the algorithmically eliminating at least some of the rows comprising folding together records into a smaller number of total records.

8. A system comprising a processor and memory, wherein the processor and memory in combination are operable to implement a method comprising:
receiving a trigger of machine learning model generation;
identifying a training dataset responsive to the trigger, wherein the training dataset is organized into rows and columns;
selecting a prediction target from at least one of the columns of the training dataset;
algorithmically eliminating at least some of the rows and at least some of the columns of the training dataset, the algorithmically eliminating yielding a size-reduced training dataset;
generating, for the prediction target, a plurality of machine learning models via a plurality of machine learning algorithms using a first portion of the size-reduced training dataset, wherein the generating includes, for each machine learning algorithm of the plurality of machine learning algorithms, progressively creating a plurality of candidate models for the machine learning algorithm using different configuration settings, and wherein the machine learning model generated via the machine learning algorithm corresponds to a particular candidate model of the plurality of candidate models;
wherein the progressively creating the plurality of candidate models comprises:
creating a first candidate model using particular configuration settings of the machine learning algorithm;
adjusting at least one of the particular configuration settings;
creating a second candidate model using the adjusted at least one of the particular configuration settings;
responsive to a determination that the second candidate model satisfies continuation criteria relative to the first candidate model, further adjusting the at least one of the particular configuration settings; and
creating a third candidate model using the further adjusted at least one of the particular configuration settings;
measuring prediction accuracies of the plurality of machine learning models relative to the prediction target using a second portion of the size-reduced training dataset;
selecting a particular machine learning model from the plurality of machine learning models based, at least in part, on the measured prediction accuracies; and
applying the particular machine learning model to a data source.

9. The system of claim 8, wherein the continuation criteria is based at least partly on accuracy improvement.

10. The system of claim 8, wherein the continuation criteria requires that each selectable option of a plurality of selectable options be tested.

11. The system of claim 8, the algorithmically eliminating at least some of the columns comprising performing a principal component analysis to identify principal components, from among the columns of the training dataset, for the prediction target.

12. The system of claim 11, wherein the algorithmically eliminating at least some of the columns comprises:
converting the columns into a set of linearly uncorrelated variables;
identifying particular columns of the converted columns that contribute over a threshold in terms of factor importance; and
eliminating any columns of the converted columns that do not contribute over the threshold in terms of factor importance.

13. The system of claim 8, wherein the algorithmically eliminating at least some of the rows comprises folding together records into a smaller number of total records.

14. A computer-program product comprising a non-transitory computer-usable medium having computer-readable program code embodied therein, the computer-readable program code adapted to be executed to implement a method comprising:
receiving a trigger of machine learning model generation;
identifying a training dataset responsive to the trigger, wherein the training dataset is organized into rows and columns;
selecting a prediction target from at least one of the columns of the training dataset;
algorithmically eliminating at least some of the rows and at least some of the columns of the training dataset, the algorithmically eliminating yielding a size-reduced training dataset;
generating, for the prediction target, a plurality of machine learning models via a plurality of machine learning algorithms using a first portion of the size-reduced training dataset, wherein the generating includes, for each machine learning algorithm of the plurality of machine learning algorithms, progressively creating a plurality of candidate models for the machine learning algorithm using different configuration settings, and wherein the machine learning model generated via the machine learning algorithm corresponds to a particular candidate model of the plurality of candidate models;
wherein the progressively creating the plurality of candidate models comprises:
creating a first candidate model using particular configuration settings of the machine learning algorithm;

adjusting at least one of the particular configuration settings;

creating a second candidate model using the adjusted at least one of the particular configuration settings;

responsive to a determination that the second candidate model satisfies continuation criteria relative to the first candidate model, further adjusting the at least one of the particular configuration settings; and creating a third candidate model using the further adjusted at least one of the particular configuration settings:

measuring prediction accuracies of the plurality of machine learning models relative to the prediction target using a second portion of the size-reduced training dataset;

selecting a particular machine learning model from the plurality of machine learning models based, at least in part, on the measured prediction accuracies; and applying the particular machine learning model to a data source.

15. A method of performance-enhanced machine-learning model creation comprising, by a computer system:

receiving a trigger of machine learning model generation;

identifying a training dataset responsive to the trigger, wherein the training dataset is organized into rows and columns;

selecting a prediction target from at least one of the columns of the training dataset;

algorithmically eliminating at least some of the rows and at least some of the columns of the training dataset, the algorithmically eliminating yielding a size-reduced training dataset, the algorithmically eliminating at least some of the columns comprising performing a principal component analysis to identify principal components, from among the columns of the training dataset, for the prediction target;

generating, for the prediction target, a plurality of machine learning models via a plurality of machine learning algorithms using a first portion of the size-reduced training dataset;

measuring prediction accuracies of the plurality of machine learning models relative to the prediction target using a second portion of the size-reduced training dataset;

selecting a particular machine learning model from the plurality of machine learning models based, at least in part, on the measured prediction accuracies; and applying the particular machine learning model to a data source.

16. A method of performance-enhanced machine-learning model creation comprising, by a computer system:

receiving a trigger of machine learning model generation;

identifying a training dataset responsive to the trigger, wherein the training dataset is organized into rows and columns;

selecting a prediction target from at least one of the columns of the training dataset;

algorithmically eliminating at least some of the rows and at least some of the columns of the training dataset, the algorithmically eliminating yielding a size-reduced training dataset;

generating, for the prediction target, a plurality of machine learning models via a plurality of machine learning algorithms using a first portion of the size-reduced training dataset, wherein the generating includes, for each machine learning algorithm of the plurality of machine learning algorithms, progressively creating a plurality of candidate models for the machine learning algorithm using different configuration settings, and wherein the machine learning model generated via the machine learning algorithm corresponds to a particular candidate model of the plurality of candidate models;

wherein the progressively creating the plurality of candidate models comprises creating new candidate models using particular configuration settings that are progressively adjusted at least until continuation criteria is no longer satisfied, the continuation criteria requiring that each selectable option of a plurality of selectable options be tested;

measuring prediction accuracies of the plurality of machine learning models relative to the prediction target using a second portion of the size-reduced training dataset;

selecting a particular machine learning model from the plurality of machine learning models based, at least in part, on the measured prediction accuracies; and applying the particular machine learning model to a data source.

\* \* \* \* \*